United States Patent [19]

Sato et al.

[11] 4,366,514

[45] Dec. 28, 1982

[54] MAGNETIC REPRODUCING APPARATUS

[75] Inventors: Masaaki Sato, Hachioji; Kazumi Miyaji, Fuchu; Masahide Yoshida, Hachioji; Norio Fukuoka, Hachioji; Kazuo Nakasho, Hachioji; Kenji Furuta, Hachioji, all of Japan

[73] Assignee: Olympus Optical Company Limited, Tokyo, Japan

[21] Appl. No.: 218,692

[22] Filed: Dec. 22, 1980

Related U.S. Application Data

[63] Continuation of Ser. No. 80,797, Sep. 28, 1979.

[30] Foreign Application Priority Data

Sep. 28, 1978 [JP] Japan ................................ 53-119777
Sep. 28, 1978 [JP] Japan ................................ 53-119778
Sep. 28, 1978 [JP] Japan ................................ 53-119779

[51] Int. Cl.³ ........................ G11B 15/48; G11B 15/18
[52] U.S. Cl. ..................................... 360/74.4; 360/71
[58] Field of Search .................. 360/74.4, 74.1, 71; 369/50

[56] References Cited

U.S. PATENT DOCUMENTS

| | | | |
|---|---|---|---|
| 3,532,835 | 10/1970 | Nakayama et al. | 360/74.4 |
| 4,000,517 | 12/1976 | Brickerd, Jr. | 360/74.1 |
| 4,075,435 | 2/1978 | Eppler, Jr. | 369/50 |
| 4,093,831 | 6/1978 | Sharp et al. | 369/50 |
| 4,207,440 | 6/1980 | Schittman | 369/50 |

Primary Examiner—Vincent P. Canney
Attorney, Agent, or Firm—Toren, McGeady & Stanger

[57] ABSTRACT

A magnetic reproducing apparatus for reproducing recorded contents of a magnetic tape with the use of a reproducing head comprises a magnetic tape, a magnetic reproducing head, a tape drive mechanism, means for detecting an interlude or a cease period of a reproduced sound from a non-recorded portion of the tape, and means for compulsively maintaining the detected interlude period for a predetermined time.

2 Claims, 6 Drawing Figures

MAGNETIC REPRODUCING APPARATUS

This is a continuation of application Ser. No. 080,797, filed Sept. 28, 1979.

BACKGROUND OF THE INVENTION

The present invention relates to a magnetic reproducing apparatus for adjusting a time base of an interlude period of a reproduced sound thereby to control a reproducing time of a magnetic tape without disturbing the recorded contents thereof.

Recently, stenography and typing may be performed by transcribing the contents recorded on a magnetic tape.

If such method is employed, however, stenographing or typing process simply cannot catch up with the reproducing speed of the tape. Accordingly, there has been provided, for example, a foot switch for the purpose of stopping the running of the tape when the stenographing or typing cannot follow the reproducing speed, and thereafter, restarting the tape by the foot switch.

If the tape is stopped at a proper position as described above, however, a reproduced sound is sometimes cut off during a paragraph, and as a result, when restarting, the portion first appearing at the restart cannot be clear in meaning.

Therefore, there has been developed a transcribing machine provided with a so-called back space pedal for winding back a tape, in addition to a foot switch. However, this machine requires a treadle operation which is troublesome and which often results in excessive time consumption because of over rewinding. Such operation further requires a great deal of skill.

A variable speed control device has recently been developed for varying a speed by fixing a frequency characteristic almost as it is. Such device, however, requires a complicated and expensive circuit, and when it is actually used, a time base is unnecessarily extended and the efficiency is lowered.

SUMMARY OF THE INVENTION

An object of the present invention is to eliminate the above described disadvantages of the conventional magnetic reproducing apparatus.

Another object of the present invention is to provide a magnetic reproducing apparatus in which the recorded contents of a magnetic tape can be precisely and efficiently stenographed or typed and having a simple construction by detecting an interlude or a crease period of a reproduced sound and maintaining this period for a predetermined time.

Another object of the present invention is to provide a magnetic reproducing apparatus in which the recorded contents of a magnetic tape can be precisely and efficiently stenographed or typed by controlling a time base of an interlude or a crease period of a reproduced sound in proportion to a time base of a duration of the reproduced sound and by shortening the time base of the interlude period when continuing the period over a predetermined value.

A further object of the present invention is to provide a magnetic reproducing apparatus in which the recorded contents of a magnetic tape can be precisely stenographed or typed with a simple construction by stopping the tape or running it with very slow speed at an interlude of a paragraph and by restarting running of the tape with a constant speed in accordance with a voice signal of a stenographist or a typist, if necessary.

According to the present invention, a magnetic reproducing apparatus for reproducing recorded contents of a magnetic tape with the use of a reproducing head comprises a magnetic reproducing head, a tape drive mechanism, means for detecting an interlude or a cease period of a reproduced sound from a non-recorded portion of the tape, and means for compulsively maintaining the detected interlude period for a predetermined time.

A magnetic reproducing apparatus for reproducing recorded contents of a magnetic tape with the use of a reproducing head comprises a magnetic tape, a magnetic reproducing head, a tape drive mechanism, means for detecting a duration of a reproduced sound from a recorded portion of the tape, means for detecting an interlude or a cease period of a reproduced sound from a non-recorded portion of the tape, and means for controlling a time base of the detected interlude period in proportion to a time base of the detected duration of the reproduced sound.

Use is made of two magnetic reproducing heads which are arranged at predetermined space and when these reproducing heads detect one and during the same interlude period, simultaneously, the magnetic tape is subjected to a quick running.

A magnetic reproducing apparatus for reproducing recorded contents of a magnetic tape with the use of a reproducing head comprises a magnetic tape, a magnetic reproducing head, a tape drive mechanism, means for detecting an interlude or a cease period of a reproduced sound from a non-recorded portion of the tape, means for automatically stopping the tape drive mechanism when the interlude period is detected, and means for restarting the tape drive mechanism at a desired time.

The means for restarting the tape mechanism at a desired time comprises a microphone for converting a sound signal into an electric signal and means for signal-processing the output of the microphone to drive the tape drive mechanism.

DESCRIPTION OF THE PREFERRED EMBODIMENT

Figure 1:
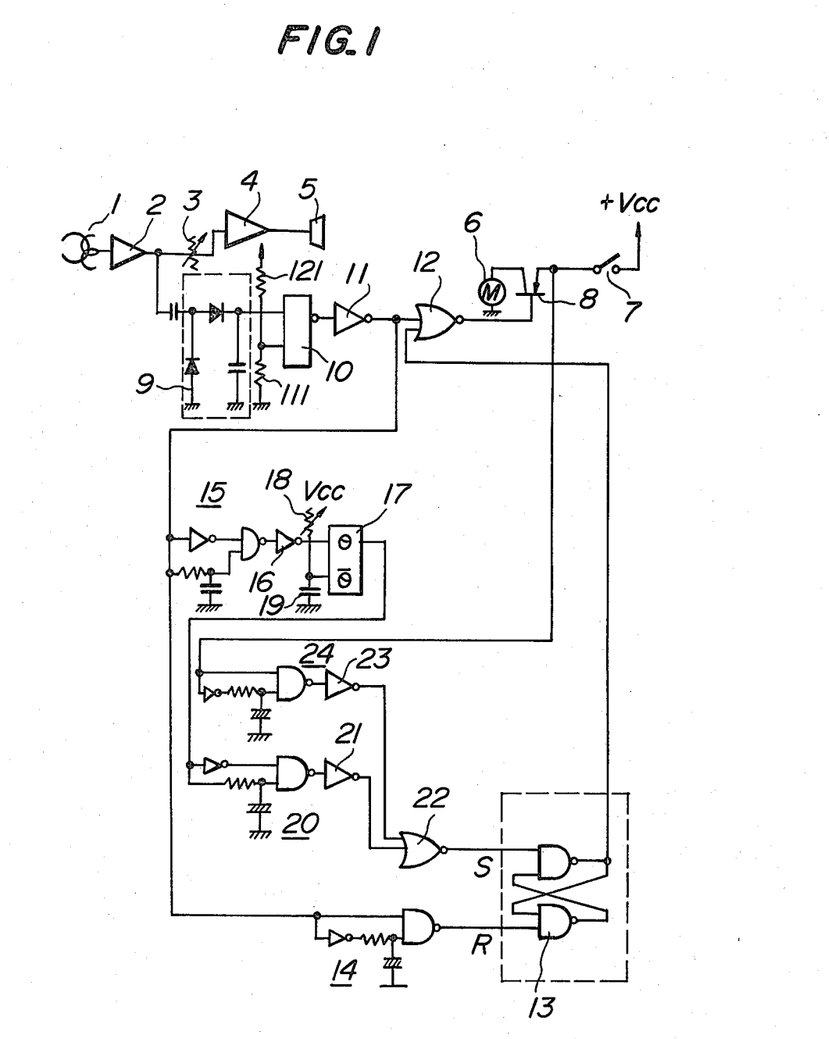
FIG. 1 is a circuit diagram showing one embodiment of a magnetic reproducing apparatus according to the present invention.
Figure 2:
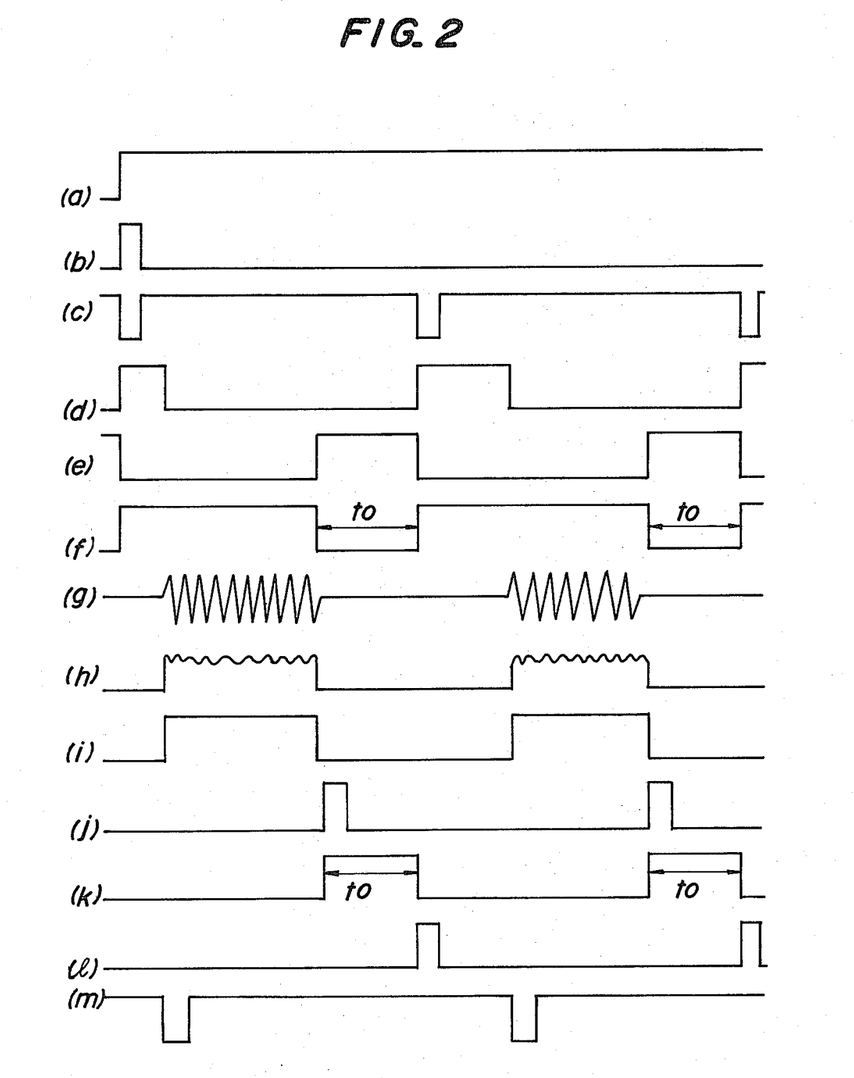
FIG. 2 is a time chart for explaining the embodiment shown in FIG. 1.

Referring to FIGS. 1 and 2, one embodiment of a magnetic reproducing apparatus according to the present invention will be explained.

Reference numeral 1 is a reproducing head which is connected to a speaker 5 through a reproducing amplifier circuit 2, a volume control circuit 3 and an output amplifier circuit 4.

On the other hand, a motor 6 for driving tape running is connected to an electric supply source +Vcc through a main switch 7, and between the motor 6 and the main switch 7 is connected a transistor 8. This transistor 8 is for controlling the starting and stopping of the motor 6 by a signal applied to its base electrode.

An output terminal of the reproducing amplifier 2 is connected to one input terminal of a comparator 10 through a rectifier circuit 9. The comparator 10 has the other input terminal connected to a setting circuit consisting of resistors 111, 121, and the setting value of the setting circuit is compared with the output of the rectifier circuit 9 to generate the "L" output when the output of the rectifier circuit 9 is more than the setting value.

The output terminal of the comparator 10 is further connected to one input terminal of a NOR gate 12 through an inverter 11. The NOR gate 12 has the other input terminal connected to an output terminal of an RS flip-flop 13, (hereinafter referred to as RS-FF 13), and further has the output terminal connected to the base of the transistor 8.

The output terminal of the inverter 11 is connected to a reset terminal of the RS-FF 13 through a pulse generating circuit 14. In this case, the pulse generating circuit 14 consists of an NAND gate, an inverter, a resistor, a capacitor and the like and generates a pulse-like "L" output at the leading edge of this signal when an "H" signal is applied thereto.

The output terminal of the inverter 11 is connected to one input terminal of a timer 17 through the pulse generating circuit 15 and the inverter 16.

The pulse generating circuit 15 consists of an NAND gate, an inverter, a resistor, a capacitor and the like, and generates a pulse-like "L" output at the rising edge of this signal when the "H" signal is applied thereto. The timer 17 has another input terminal connected to a time constant circuit consisting of a resistor 18 and a capacitor 19, while if the "H" signal is applied to the input terminal, the "H" output is generated by a given time $t_O$ determined by the time constant circuit.

The output terminal of the timer 17 is connected to one input terminal of a gate 22 through a pulse generating circuit 20 and an inverter 21. In this case, the pulse generating circuit 20 serves in the same manner as the above-described pulse generating circuit 15.

The NOR gate 22 has an other input terminal connected to an emitter of the transistor 8 through an inverter 23 and a pulse generating circuit 24 and further has an output terminal connected to a set terminal of the RS-FF 13. The pulse generating circuit 24 serves in the same manner as the above-described pulse generating circuit 14.

An operation of the apparatus according to the invention constructed as described above will be explained. In the first place, when the main switch 7 is closed, the "H" output shown in FIG. 2a is applied to the pulse generating circuit 24. Then, the pulse generating circuit 24 generates the pulse-like "L" output at the leading edge of the "H" output, so that the "H" output shown in FIG. 2b is generated through the inverter 23 and applied as a set signal shown in FIG. 2c to the set terminal of the RS-FF 13 through the NOR gate 22.

Figure 3:
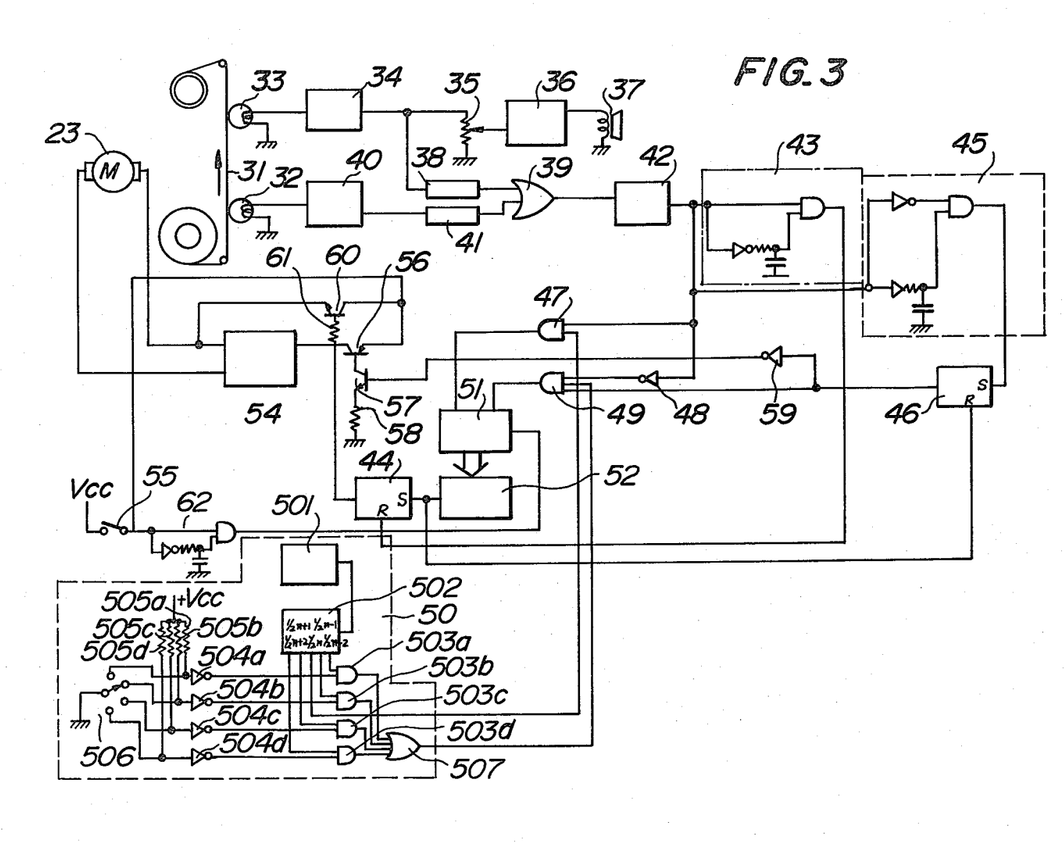
FIG. 3 is a circuit diagram showing second embodiment of the apparatus according to the present invention.

Therefore, the "H" output shown in FIG. 3d is generated from the RS-FF 13, the "L" output shown in FIG. 2e is applied to the base of the transistor 8 through the NOR gate 12, and the transistor 8 will have an ON state. When the transistor 8 becomes ON, the motor 6 is energized by the output shown in FIG. 2f and the tape starts running.

Under this condition, if the reproduced output shown in FIG. 2g is generated through the amplifier circuit 2, this output is applied to the speaker 5 through the volume control circuit 3 and the output amplifier circuit 4 thereby to generate a sound as a reproduced sound. At the same time, if the reproduced output of the amplifier circuit 2 is applied to the rectifier circuit 9, the output shown in FIG. 2h is generated from the rectifier circuit 9. Then, since the comparator 10 generates the "L" output when the output of the rectifier circuit 9 is more than the setting value of the setting circuit, the "H" output shown in FIG. 2i is generated through the inverter 11 during generation of the reproduced output. The "H" output generated through the inverter 11 is applied to the pulse generating circuit 14. Then, the pulse generating circuit 14 generates the pulse-like "L" output at the leading edge of the "H" output, so that the "L" output is applied to the reset terminal of the RS-FF 13 as a reset signal as shown in FIG. 2m.

In this manner, the RS-FF 13 reverses its state and the "L" output shown in FIG. 2d, but in this case, the "H" output generated through the inverter 11 is also applied to the NOR gate 12, so that the transistor 8 will have an ON state by the "L" output applied to the base and the motor 6 continues to drive the running of the tape.

Thereafter, the reproducing head 1 reaches the non-recorded portion of the tape, that is, the interlude period of the reproduced sound, and when the reproduced output disappears as shown in FIG. 2g, the output of the rectifier circuit 9 also disappears, and the inverter 11 generates the "L" output as shown in FIG. 2i. Therefore, the "H" output shown in FIG. 2e is generated by the NOR gate 12, and as a result, the transistor 8 will have an OFF state, the motor 6 is stopped and the tape running is also stopped. Further, if the inverter 11 generates the "L" output, a "L" output at the trailing edge of the "L" output is generated by the pulse generating circuit 15, and the "H" output shown in FIG. 2j is applied to the timer 17 through the inverter 16. Then, the timer 17 generates the "H" output shown in FIG. 2k by a given time $t_O$ determined by the time constant circuit consisting of the resistor 18 and the capacitor 19 and generates the "L" output after the time $t_O$.

When the output of the timer 17 is inverted into the "L" output, the pulse-like "L" output is generated from the pulse generating circuit 20 at the trailing edge of the output, so that the "H" output shown in FIG. 2l is generated through the inverter 21 and applied to the set terminal of the RS-FF 13 through the NOR gate 22 as a set signal shown in FIG. 2c.

The "H" output shown in FIG. 2d is again generated from the RS-FF 13 and the "L" output shown in FIG. 2e is applied to the base of the transistor 8 through the NOR gate 12, so as to make the transistor 8 to the ON state, the motor 6 is reenergized and the tape restarts running.

In this case, the stop period of the motor 6 can optionally be changed in accordance with the setting time $t_O$ of the timer 17.

At this time the apparatus returns to the original state, and similar operation as described above is repeated every time the reproduced output is generated in the reproducing head 1.

Accordingly, with such construction, the tape running is once stopped when the interlude period of the reproduced sound comes and this period can be maintained for a predetermined time, so that stenographing or typing can be completed in this period without interrupting the paragraph midway, and as a result, the recorded contents can be precisely stenographed or typed. The invention does not require any troublesome operation such as stopping or winding back the running tape as in the conventional transcribing machine, and there is no such disadvantage that time is wasted by winding back the tape, so that the recorded contents can efficiently be stenographed or typed. In addition, the circuit can easily be constructed by combining each kind of logical elements, so that the invention is simple in construction and cheap in cost as compared with the conventional variable speed control device.

FIG. 3 shows another embodiment of the apparatus according to the present invention. Reference numeral 31 is a magnetic tape having recorded contents thereon. Two reproducing heads 32, 33 are arranged along and in contact with the tape 31 with a predetermined distance.

The head 33 is connected to a speaker 37 through a reproducing amplifier circuit 34, a volume control circuit 35 and an output amplifier circuit 36. The output terminal of the amplifier circuit 34 is connected to one input terminal of an OR gate 39 through a rectifier circuit 38.

The reproducing head 32 is connected to another input terminal of the OR gate 39 through a reproducing amplifier circuit 40 and a rectifier circuit 41.

The OR gate 39 has an output terminal connected to a comparing and shaping circuit 42. This circuit 42 generates an "H" output when the reproduced output applied through the OR gate 39 is more than a predetermined level.

The output terminal of the comparing and shaping circuit 42 is connected to a reset terminal of a first flip-flop 44 (hereinafter referred to as RS-FF 44) through a pulse generating circuit 43 and to a set terminal of a second flip-flop 46 (hereinafter referred to as RS-FF 46) through another pulse generating circuit 45. In this case, the pulse generating circuit 43 generates a pulse-like "H" output at the leading edge of the output of the circuit 42 and the pulse generating circuit 45 generates a pulse-like "H" output at the trailing edge of the output of the circuit 42.

The output terminal of the comparing and shaping circuit 42 is connected to one input terminal of a first AND gate 47 and to a first terminal of a second AND gate 49 through an inverter 48.

Reference numeral 50 is a clock pulse generating circuit for generating clock pulses having a plurality of demultiply ratios (five kinds of $\frac{1}{2}^{n+2}, \frac{1}{2}^{n+1}, \frac{1}{2}^{n}, \frac{1}{2}^{n-1}$, and $\frac{1}{2}^{n-2}$ in this embodiment) by dividing the output of an oscillator circuit 501 in a frequency divider 502. In this case, the clock pulse having any one of demultiply ratio, for example $\frac{1}{2}^{n}$, is directly applied to another input terminal of the AND gate 47 and the residual clock pulses having residual demultiply ratios are applied to first input terminals of the AND gates 503a–503d, respectively. Second input terminals of the AND gates 503a–503d are connected to a supply source +Vcc through inverters 504a–504d and resistors 505a–505d, respectively, and the input terminals of the inverters 504a–504d are connected to a selector switch 506 so that the corresponding one of the AND gates 503a–503d is made into ON state by the selection of the switch 506 to generate clock pulses of a desired demultiply ratio. The outputs of the AND gates 503a–d are applied to second input terminal of the AND gate 49 through an OR gate 507.

The AND gate 47 has an output terminal connected to an adding input terminal of an up-down counter 51 and the AND gate 49 has an output terminal connected to a subtractive input terminal of the counter 51. The AND gate 49 also has a third input terminal connected to the output terminal of the RS-FF 46.

The counter 51 adds clock pulses applied through the AND gate 47 and subtracts the counted contents by clock pulses applied through the AND gate 49.

The output terminal of the counter 51 is connected to a comparator 52 which generaters an "H" output only when the counted content of the counter 51 becomes "O".

The output terminal of the counter 52 is connected to the set terminal of the RS-FF 44 and to the reset terminal of the RS-FF 46.

A motor 53 for driving running of the tape 31 is connected to a control circuit 54 which is connected to a supply source +Vcc through a main switch 55. The control circuit 54 controls running of the tape 31 with a given constant speed. A transistor 56 is connected between the control circuit 54 and the main switch 55. The transistor 56 has a base connected to ground through a transistor 57 and a resistor 58 and the base of the transistor 57 is connected to the output terminal of the RS-FF 46 through an inverter 59.

An transistor 60 is connected in parallel with a circuit combination of the control circuit 54 and the transistor 56.

The transistor 60 serves to directly connect the motor 53 to the supply source +Vcc by its ON state thereby to drive the motor 53 with high speed resulting in a quick running of the tape and has a base connected to the output terminal of the RS-FF 44 through a resistor 61.

The load terminal of the main switch 55 connected to a clear terminal of the counter 51 through a pulse generating circuit 62 which generates a pulse-like "H" output by the throwing of the main switch 55 and clears the content of the counter 51 to a "O" state.

Figure 4:
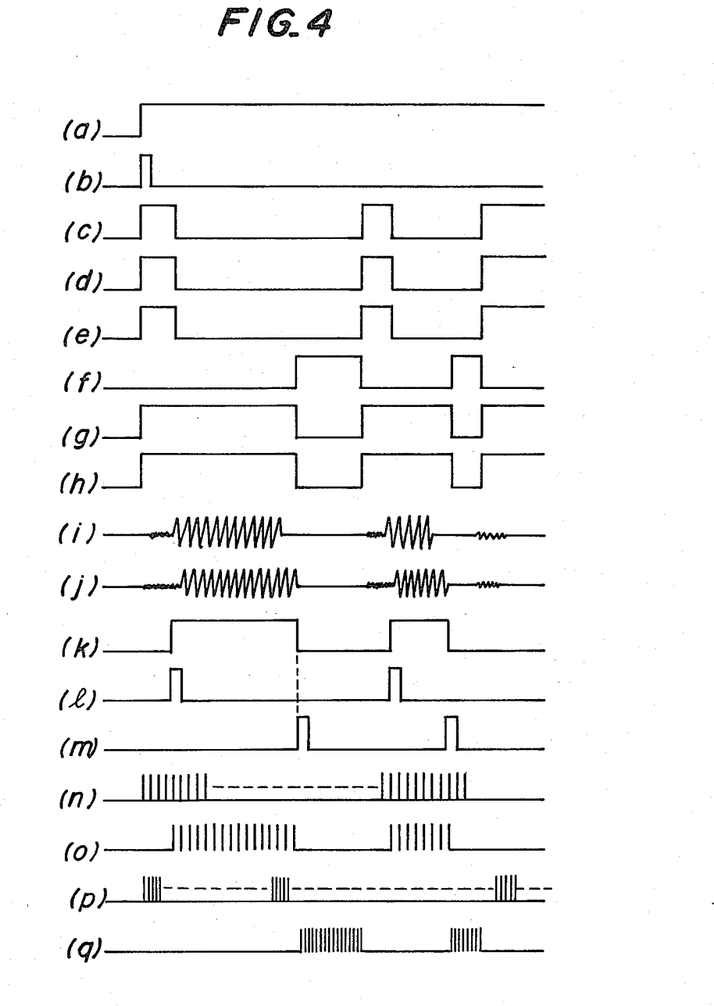
FIG. 4 is a time chart for explaining the embodiment shown in FIG. 3.

An operation of the apparatus constructed as described above will be explained with reference to FIG. 4. In the first place, when the main switch 55 is closed the "H" output shown in FIG. 4a is applied to the pulse generating circuit 62. Then the circuit 62 generates a pulse-like "H" output shown in FIG. 4b. This "H" output clears the content of the counter 51 to "O" state so that the comparator 52 generates an "H" output shown in FIG. 4c to set the RS-FF 44 and then the RS-FF 44 generates an "H" output shown in FIG. 4d thereby to render the transistor 60 ON state as shown in FIG. 4e.

Therefore, the voltage of the supply source +Vcc is directly applied to the motor 53 through the transistor 60 so that the motor 53 is driven with a high speed resulting in a rapid running of the tape 31.

At the same time, the "H" output of the comparator 52 is applied to the reset terminal of the RS-FF 46 which is then reset and generates a "L" output shown in FIG. 4f. Then, an "H" output shown in FIG. 4g is generated through the inverter 59 so that the transistor 57 becomes ON state and then the transistor 56 becomes ON state as shown in FIG. 4h resulting in a steady state of the control circuit 54.

In this condition, if the recorded portion of the tape 31, that is, a duration of the reproduced sound reaches the reproducing head 32 and when the reproduced output shown in FIG. 4i is generated from the reproducing amplifier circuit 40, the "H" output shown in FIG. 4k is generated from the comparing and shaping circuit 42 through the rectifier circuit 41 and the OR gate 39. Then the pulse generating circuit 43 generates at the leading edge of this "H" output a pulse-like "H" output shown in FIG. 4l so that the RS-FF 44 is reset and the transistor 60 is also rendered OFF state and thus the motor 53 is controlled by the control circuit 54 thereby to control running of the tape 31 with a given constant speed.

The "H" output of the comparing and shaping circuit 42 is also applied to one input terminal of the AND gate 47. In this case to another input terminal of the AND gate 47 is applied from the clock pulse generating circuit 50 clock pulses of given demultiply ratio (for example, $\frac{1}{2}^n$ in this embodiment) shown in FIG. 4n so that clock pulses shown in FIG. 4o are applied to the adding terminal of the up-down counter 51 through the AND gate 47.

Thereafter, when the recorded portion of the tape 31 reaches the reproducing head 33 the amplifier circuit 34 generates reproduced output shown in FIG. 4j. This output is applied to the speaker 37 through the volume control circuits 35 and the amplifier circuit 36 resulting in a generation of reproduced sound.

Under this condition, when the non-recorded portion of the tape 31, that is, the interlude period of the reproduced sound is passed through the reproducing head 32 and reaches the reproducing head 33, the comparing and shaping circuit 42 generates a "L" output. Then, the pulse generating circuit 45 generates a pulse-like "H" output shown in FIG. 4m at the trailing edge of the "L" output so that the RS-FF 46 is set and generates an "H" output shown in FIG. 4f. Thereafter, the inverter 59 generates an "L" output shown in FIG. 4g by generation of the "H" output so that the transistor 57 becomes OFF state ad the transistor 56 becomes OFF state as shown in FIG. 4h thereby to stop the drive of the motor 53 and thus running of the tape 31. The "H" output of the RS-FF 46 is also applied to the third input terminal of the AND gate 49. In this case, to the first input terminal of the AND gate 49 is applied the "H" output from the inverter 48 and to the second input terminal is applied clock pulses of given demultiply ratio (for example $\frac{1}{2}^{n-1}$ in this embodiment) shown in FIG. 4p from the clock generator 50 so that the up-down counter 51 receives at its subtractive input terminal the clock pulses shown in FIG. 4q through the AND gate 49 and thus the contents of the counter 51 are subjected to subtractive counting.

When the contents of the counter 51 becomes "0" the comparator 52 again generates an "H" output shown in FIG. 4c to set the RS-FF 44 so that the RS-FF 44 generates the "H" output shown in FIG. 4d thereby to render the transistor 50 to ON state as shown in FIG. 4e. Then, the motor 53 directly receives the voltage of the supply source +Vcc through the transistor 30 and restarts with high speed resulting in a rapid running of the tape 31.

In this case, the time base of the drive stopping period of the motor 53, that is, the running stop period of the tape 31 becomes $\frac{1}{2}$ of the time base of the reproduced duration since the adding clock pulses for counting the recorded portion, that is, the duration of the reproduced sound has a demultiply ratio of $\frac{1}{2}^n$ and the subtractive clock pulses have a demultiply ratio of $\frac{1}{2}^{n-1}$ so that the subtraction is performed with double the speed of the addition. This time can optionally be changed by the selective switch 506 of the clock pulse generator 50.

At this time, the apparatus comes back to the original state, and similar operation as described above is repeated every time when the reproduced sound shown in FIGS. 4i and 4j is generated in the reproducing heads 32 and 33.

There is often generated a very short interlude period of sound in the duration of the reproduced sound by the breakdown in the midst of a speech other than the interlude of a paragraph. In this case, the reproduced output is again generated from the reproducing head 32 during the reproduced output is generated from the reproducing head 33 so that the comparing and shaping circuit 42 holds the "H" output and thus the tape running does not stop.

Accordingly, with such construction, the time base of the interlude perid of the reproduced sound can be controlled in proportion to the time base of the duration of the reproduced sound so that stenographing or typing can be completed in this period without interrupting the paragraph midway, and thus the recorded contents can precisely be stenographed or typed.

Figure 5:
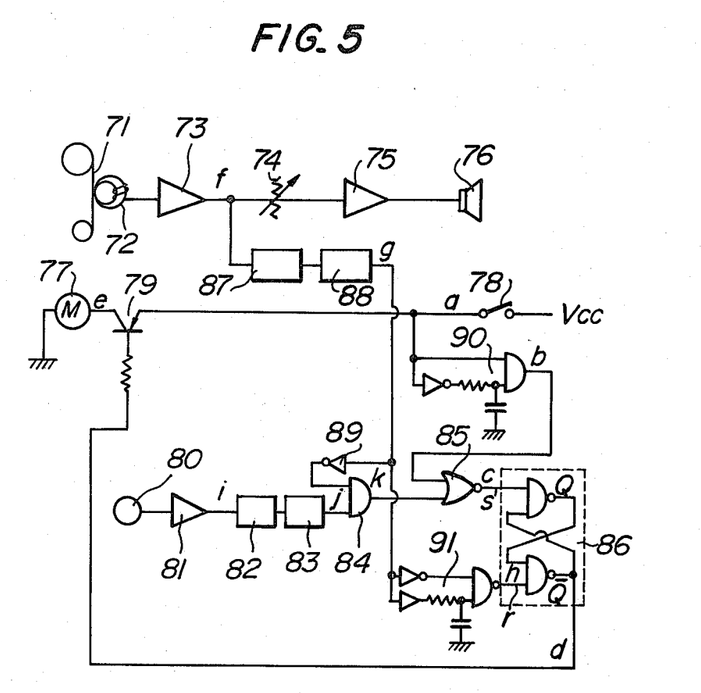
FIG. 5 is a circuit diagram showing third embodiment of the apparatus according to the present invention.

FIG. 5 shown a further embodiment of the apparatus according to the present invention. Reference numeral 71 is a magnetic tape having recorded contents thereon. A reproducing head 72 is connected to a speaker 76 through an amplifier circuit 73, a volume control circuit 74 and an output amplifier circuit 75.

A motor for driving the tape 71 is controlled by a switching transistor 79 connected to a supply source Vcc through a main switch 78. The transistor 79 receives at its base electrode a restarting signal from a restarting microphone 80. The microphone 80 is connected to a comparator 83 through an amplifier circuit 81 and a rectifier 82. The comparator 83 is connected to a set terminal s of a set-reset flip-flop (hereinafter referred to as RS-FF) 86 through an AND gate 84 and an OR gate 85.

On the other hand, the reproduced output signal of the head 72 is applied to the other input terminal of the AND gate 84 through the amplifier 73, a rectifier circuit 87, a comparator 88 and an inverter 89. The OR gate 85 receives at its other input terminal a signal from a first pulse generating circuit 90 which is connected to a supply source Vcc through the main switch 78.

The output of the head 72 is also applied to a second pulse generating circuit 91 through the amplifier 73, the rectifier 87 and the comparator 88. The output terminal of the pulse generating circuit 91 is connected to a reset terminal r of the RS-FF 86. The output of the RS-FF 86 is applied to a base of the transistor 79.

Figure 6:
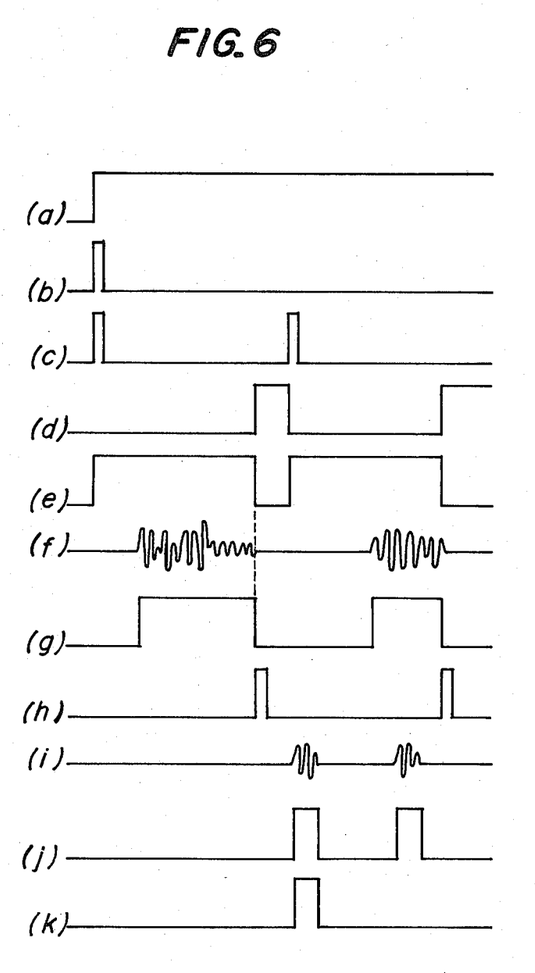
FIG. 6 is a time chart for explaining the embodiment shown in FIG. 5.

An operation of the apparatus according to the present invention constructed as described above will be explained with reference to FIG. 6. In the first place, when the main switch 78 is closed, the "H" signal shown in FIG. 6a is applied to the pulse generating circuit 90. The "H" output of the circuit 90 shown in FIG. 6b is then applied to the OR gate 85 and the "H" output of the OR gate 85 shown in FIG. 6c is applied to the set terminal of the RS-FF 86 so that it will have a set state.

The output of the RS-FF 86 shown in FIG. 6d is applied to the base of the transistor 79 so that it will have a ON state and the motor 77 is energized by the output of the transistor 79 as shown in FIG. 6e.

When the running of the tape 71 is performed by the motor 77 the recorded portion of the tape 71 reaches the head 72 so that the output of the head 72 is derived from the speaker 76 as a reproduced sound. The reproduced output shown in FIG. 6f of the amplifier 73 is applied to the second pulse generating circuit 91 through the rectifier 87 and the comparator 88. The output of the comparator 88 is shown in FIG. 6g.

When the reproduced output of the head 72 disappears at the interlude of the paragraph, the pulse generator 91 generates a pulse signal shown in FIG. 6h and this pulse is applied to the reset terminal r of the RS-FF 86 so that the output of the RS-FF 86 is applied to the transistor 79 as a reset signal and then it will have an OFF state resulting in stopping of the motor 77.

Therefore, when the head 72 detects the non-recorded portion of the tape 71, the running of the tape automatically stops so that the recorded contents can precisely be stenographed or typed.

At the next stenographing or typing ready condition, when the stenographist or typist generates a voice sound "next", the microphone 80 converts this voice sound into a sound signal which is amplified by the amplifier 81 to form an output shown in FIG. 6i. This output is applied to the AND gate 84 as a signal shown in FIG. 6j through the rectifier 82 and the comparator 83. The AND gate 84 generates an "H" output shown in FIG. 6k which is applied to the OR gate 85, so that the output of the OR gate 85 becomes "H" level and this "H" output is applied to the set terminal of the RS-FF 86 to make it set state.

When the RS-FF 86 is set, the output thereof becomes "L" level as shown in FIG. 6d do that the transistor 70 becomes ON state and the motor 77 restarts.

By repeating the above described operation the recorded contents can precisely be stenographed or typed since the stenographist or typist can restart the running of the tape at the desired time only with a voice sound.

In this case, even if the sound of the speaker 76 or the surrounding noise sound is picked up by the microphone 80 during reproducing of the contents, the apparatus does not operate erroneously, since the output of the inverter 89 becomes "L" level during reproducing of the contents and thus the output of the AND gate 84 is "L" level.

In addition, the present invention is not limited to the above embodiments but can be modified without departing the scope of the invention.

For example, in the above described embodiment, when the interlude of the reproduced sound is detected, the motor is compulsorily stopped by a predetermined time, but it is preferable to slow down a speed by rotating the motor at a low speed without stopping. Further, the circuit construction and parts used are not limited to the embodiments, but any construction and parts can be applied.

As described above, according to the present invention, the magnetic reproducing apparatus for detecting the interlude of the reproduced sound and maintaining this period by a predetermined time so as to precisely and efficiently stenograph or type the recorded contents with a simple construction.

What is claimed is:

1. In a magnetic reproducing apparatus having a magnetic tape, a magnetic reproducing head, and a tape drive mechanism and for reproducing the recorded contents of the magnetic tape by the head, the improvement comprising means for detecting a duration of a reproduced sound from a recorded portion of the tape, means for detecting an interlude or a cease period of a reproduced sound from a non-recorded portion of the tape, and means for controlling a time base of the detected interlude period in proportion to a time base of the detected duration of the reproduced sound, the non-recorded portion of tape being controlled in proportion to the time base of reproduced sound duration so that when an interlude or cease period of reproduced sound exceeds a predetermined value, the time base of the interlude period is shortened by rapid forward running of the tape.

2. In a magnetic reproducing apparatus having a magnetic tape, a magnetic reproducing head, and a tape drive mechanism and for reproducing the recorded contents of the magnetic tape by the head, the improvement comprising means for detecting a duration of a reproduced sound from a recorded portion of the tape, means for detecting an interlude or a cease period of a reproduced sound from a non-recorded portion of the tape, and means for controlling a time base of the detected interlude period in proportion to a time base of the detected duration of the reproduced sound, and wherein use is made of two magnetic reproducing heads which are arranged at predetermined space and when these reproducing heads detect one and the same interlude period, simultaneously, the magnetic tape is subjected to rapid running.

* * * * *